United States Patent

Sakuma

[11] Patent Number: 5,649,387
[45] Date of Patent: Jul. 22, 1997

[54] CROP CULTIVATION APPARATUS

[75] Inventor: Harushige Sakuma, Okinawa-ken, Japan

[73] Assignee: Director General of Japan International Research Center for Agricultural Sciences, Tsukuba, Japan

[21] Appl. No.: 506,118

[22] Filed: Jul. 24, 1995

[30] Foreign Application Priority Data

Aug. 31, 1994 [JP] Japan .................................. 6-207195

[51] Int. Cl.⁶ .................................................. A01G 31/00
[52] U.S. Cl. ........................................ 47/62; 47/59
[58] Field of Search ........................... 47/62 C, 62, 59

[56] References Cited

U.S. PATENT DOCUMENTS

| 3,250,606 | 5/1966 | Murray | 47/62 |
| 3,608,240 | 9/1971 | Gunn | 47/62 |
| 3,766,684 | 10/1973 | Kato | 47/62 |
| 4,118,891 | 10/1978 | Kehl et al. | 47/62 |
| 4,149,970 | 4/1979 | Atkins et al. | 47/62 |
| 5,076,010 | 12/1991 | Rollins | 47/62 |

FOREIGN PATENT DOCUMENTS

| 0235953 | 9/1987 | European Pat. Off. | 47/62 C |
| 0301619 | 2/1989 | European Pat. Off. | 47/62 C |
| 1124894 | 11/1984 | U.S.S.R. | 47/62 C |
| 1248565 | 8/1986 | U.S.S.R. | 47/62 C |
| 1537188 | 1/1990 | U.S.S.R. | 47/62 C |

*Primary Examiner*—Terry Lee Melius
*Assistant Examiner*—Joanne C. Downs
*Attorney, Agent, or Firm*—Nikaido, Marmelstein, Murray & Oram LLP

[57] ABSTRACT

There is provided a crop cultivation apparatus which comprises a cultivation bed having a ditch formed on the bottom thereof for receiving and supplying a culture liquid, a liquid level adjusting tank provided adjacent to and communicated with the cultivation bed, a culture liquid tank provided at a higher position than the cultivation bed for supplying the culture liquid to the liquid level adjusting tank, a liquid absorbent sheet for upwardly absorbing the culture liquid from the ditch formed on the bottom of the cultivation bed, and a mass of culture medium provided upwardly of the liquid absorbent sheet for cultivating a crop.

11 Claims, 3 Drawing Sheets

CROP CULTIVATION APPARATUS

BACKGROUND OF THE INVENTION

This invention relates to a crop cultivation apparatus, particularly to a crop cultivation apparatus of a kind in which culture liquid is supplied from a culture liquid tank to a culture medium by virtue of gravitation and capillary phenomenon.

In the prior art, when crop cultivation is to be conducted by the use of a culture liquid, it is necessary to utilize various large scale equipments, particularly to use power equipment to periodically supply the culture liquid to a cultivation bed. Usually, in a crop cultivation system using a culture liquid, one or more pumps are used to cause the culture liquid to flow from a culture liquid tank to a cultivation bed, and then from the cultivation bed back to the culture liquid tank forming a liquid circuit therebetween. This is therefore referred to as the circulation method. Alternatively, a culture liquid is just supplied to a cultivation bed in accordance with a predetermined time interval and does not flow back. Such an operation is therefore referred to as one-way flowing method.

However, in both of the above-mentioned conventional methods, since various larger scale equipments are required and hence a house such as a glass house is needed to house these equipments, the costs for equipment purchasing and equipment installation become extremely high. Further, since an electric power supply is necessary in order to operate one or more pumps, and the pump and many other equipments need proper and periodical maintenance, another kind of cost, i.e., a cost for equipment running and maintenance might also be too large a burden for a farmer.

Moreover, in the aforesaid circulation method, since a large amount of culture liquid is required to keep a desired liquid circulation between the culture liquid tank and the cultivation bed, there often occurs a problem that a crop absorbs too much of a culture liquid or only selectively absorbs one particular component of the culture liquid, resulting in an unbalanced composition in the culture liquid. Accordingly, in order to keep various components at the desired concentrations to obtain a required composition for the culture liquid, it is necessary to check and analyze from time to time the composition of the culture liquid in the culture liquid tank and to supplement a certain component which has been found insufficient for the culture liquid.

Further, in the aforesaid one-way flowing method, although it is not necessary to periodically analyze the composition of the culture liquid in the culture liquid tank nor to supplement a certain component, it is extremely difficult to supply a correct amount of culture liquid that is exactly good for an actual consumption by the crop. In fact, the culture liquid is supplied in a much larger amount than is necessary for the actual consumption by the crop. As a result a considerable amount of the culture liquid has to be drained away from a cultivation bed, which not only causes a waste of the culture liquid but also contaminates the surrounding environment.

SUMMARY OF THE INVENTION

An object of the present invention is to provide a crop cultivation apparatus adapted to be positioned on a crop field and capable of supplying only the necessary amount of a culture liquid from a culture liquid tank to a cultivation bed by virtue of gravitation and capillary phenomenon. In this manner, the crop cultivation may be continued without the use of any power equipment, so that the operation and maintenance of the apparatus become extremely easy.

According to the present invention, there is provided an improved crop cultivation apparatus which comprises a cultivation bed having a ditch formed on the bottom thereof for receiving and supplying a culture liquid, a liquid level adjusting tank provided adjacent to and communicated with the cultivation bed, a culture liquid tank provided at a higher position than the cultivation bed for supplying the culture liquid to the liquid level adjusting tank, a liquid absorbent sheet for upwardly absorbing the culture liquid from the ditch formed on the bottom of the cultivation bed, and a mass of culture medium provided upwardly of the liquid absorbent sheet for cultivating a crop.

In one aspect of the invention, the liquid level adjusting tank is communicated with the ditch of the cultivation bed, the adjusting tank being provided such that an amount of the culture liquid flowing into the ditch does not exceed a predetermined level.

In another aspect of the invention, the liquid absorbent sheet is provided such that the bottom area of the cultivation bed is covered by the sheet.

In a further aspect of the invention, the liquid absorbent sheet is partially dipped in the ditch of the cultivation bed for upwardly absorbing the culture liquid.

The other objects and features of this invention will become understood from the following descriptions with reference to the accompanying drawings.

DETAILED DESCRIPTION OF THE PREFERRED EMBODIMENT

Figure 1:
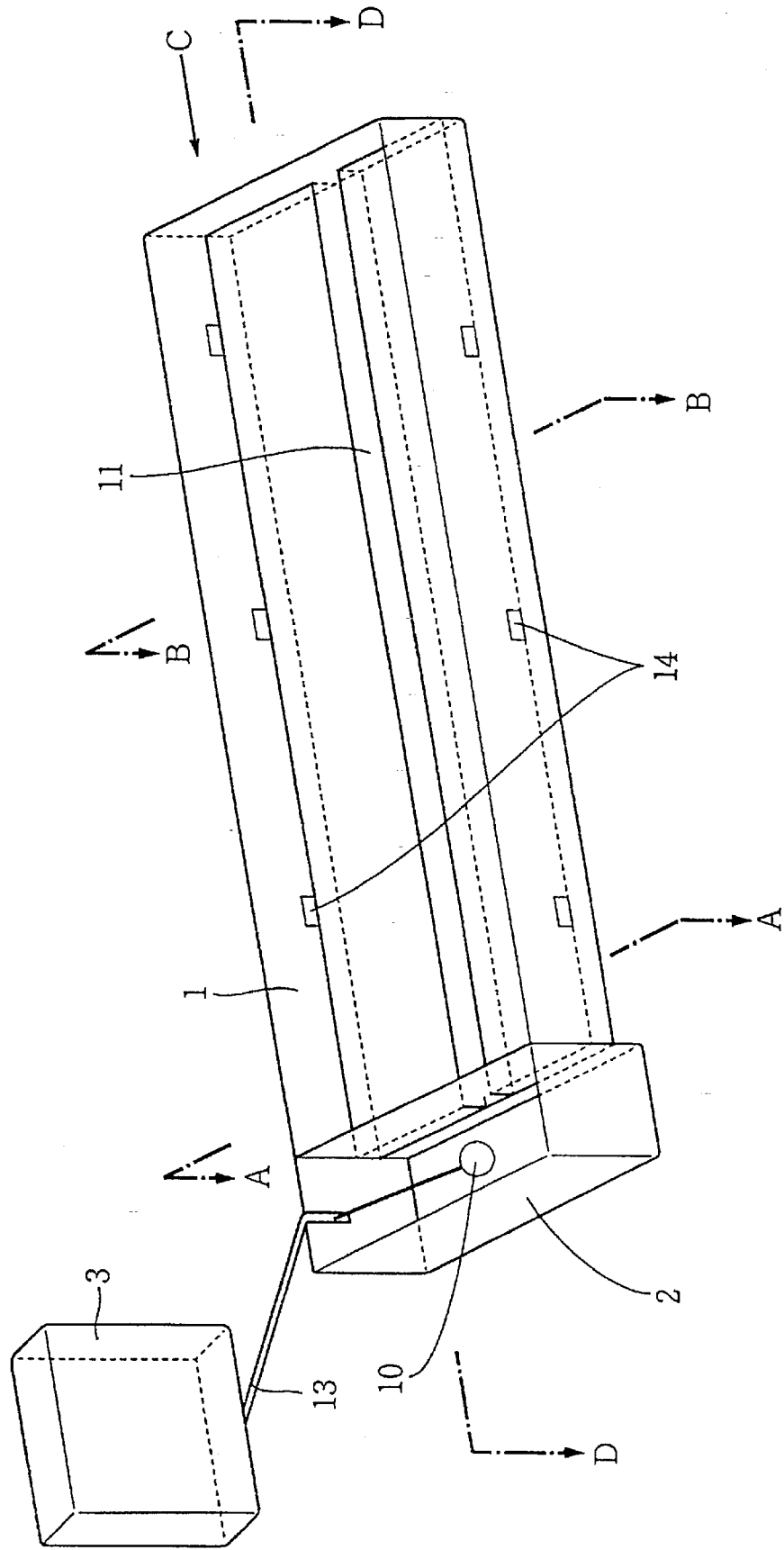
FIG. 1 is a schematic perspective view showing a crop cultivation apparatus according to the present invention.

Referring to FIG. 1, a crop cultivation apparatus of the present invention comprises a cultivation bed 1 for cultivating a crop by means of a culture liquid, a liquid level adjusting tank 2 provided adjacent to and communicating with the cultivation bed 1, and a culture liquid tank 3 provided at a higher position than the liquid level adjusting tank 2. The culture liquid tank 3 is communicated with the liquid adjusting tank 2 through a pipe 13.

As illustrated in FIG., 1, since the culture liquid tank 3 is provided at a higher position than the liquid level adjusting tank 2, the culture liquid may flow automatically from the culture liquid tank 3 to the liquid level adjusting tank 2, by gravity.

The cultivation bed 1 may be in various forms or shapes. Preferably, the cultivation bed 1 is constructed having a lateral cross section which is a generally rectangular shape, with the entire beding in a rectangular parallelepiped shape. The liquid level adjusting tank 2 is provided at one end of the cultivation bed 1.

Figure 2:
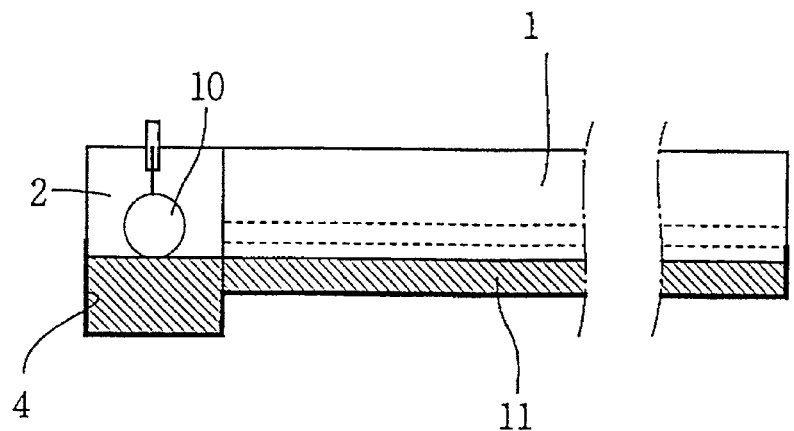
FIG. 2 is a longitudinal cross sectional view of the apparatus, taken along line D—D in FIG. 1.
Figure 3:
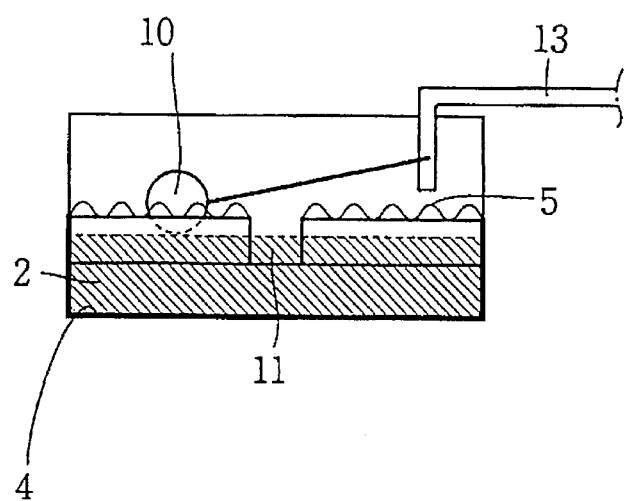
FIG. 3 is a cross sectional view of the apparatus, taken along line A—A in FIG. 1.

Referring further to FIG. 1, an elongate culture liquid ditch 11 is formed on the bottom of the cultivation bed 1. As illustrated in FIGS. 2 and 3, the culture liquid ditch 11 directly communicates with the liquid level adjusting tank 2, so the liquid level of the ditch 11 and the liquid level of the tank 2 will be the same all of the time.

The liquid level adjusting tank 2 is provided with a ball tap 10 having a float ball which is constructed to shut off the supply of the culture liquid from the culture liquid tank 3 when the float ball is raised to a predetermined level due to a liquid buoyancy as shown in FIG. 2. It is understood from FIG. 2 that, by adjusting the liquid level in the liquid level adjusting tank 2, the liquid level of the elongate ditch 11 is also simultaneously and automatically adjusted. In this way, the liquid level of the elongate ditch 11 may be continuously kept at a predetermined value, so as to prevent the culture liquid from flowing into the ditch 11 in an unnecessary larger amount.

Figure 4:
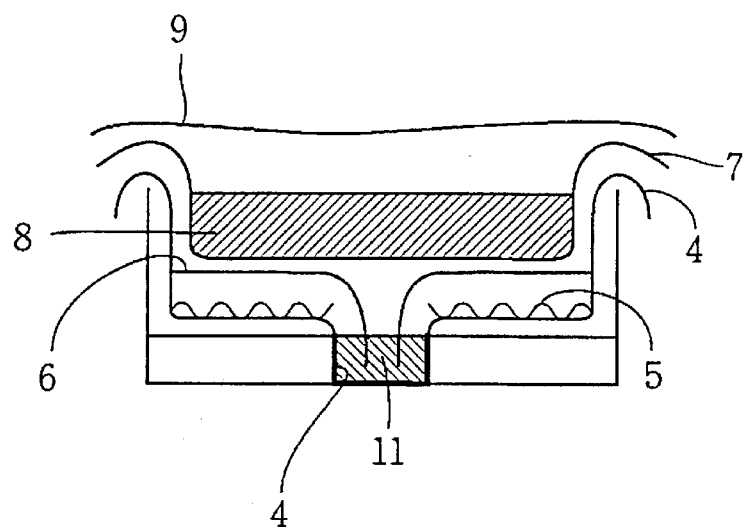
FIG. 4 is a cross sectional view of the apparatus, taken along line B—B in FIG. 1.

Referring to FIG. 4, a liquid absorbent sheet 6 is arranged over almost the entire bottom area of the cultivation bed 1. Such liquid absorbent sheet 6 is made of a porous material having an excellent water absorbability. By partially dipping the liquid absorbent sheet 6 into the culture liquid ditch 11 of the cultivation bed 1, the culture liquid may be absorbed upwardly from the ditch 11 by virtue of capillary phenomenon.

Above the liquid absorbent sheet 6 there is disposed a mass of culture medium 8 made of a porous PVA (polyvinyl alcohol) material in chip form. Since the porous PVA material also has an excellent water absorbability, the culture liquid can be upwardly absorbed thereinto from the liquid absorbent sheet 6.

Further, in order to prevent crop roots from extending through the liquid absorbent; sheet 6 into the culture liquid ditch 11, a liquid penetration sheet 7, which permits the penetration of liquid but not for crop root, is disposed so as to cover the bottom and side faces of the culture medium 8. Therefore, the culture liquid remaining in the ditch 11 and flowing upwardly through the sheet 6 can be protected from being invaded by the extending crop roots, ensuring a stabilized composition therefor.

In fact, the liquid penetration sheet 7 is arranged in direct contact with the liquid absorbent sheet 6, so that the culture liquid being upwardly absorbed through the sheet 6 may pass smoothly therethrough into the culture medium 8.

Here, the culture medium 8 not only serves to upwardly absorb the culture liquid to the upper surface thereof, but also serves to support crops growing on the culture medium 8.

Referring again to FIG. 4, the mass of the culture medium 8 is covered with a permeable covering sheet 9 to prevent the culture medium 8 from scattering out. Since the permeable covering sheet 9 is excellent in light reflection and water penetration, it is possible not only to avoid a temperature rising on the surface of the culture medium 8 due to sunlight, but also to prevent a temperature rising inside the culture medium 8, by virtue of water evaporation through the permeable sheet 9. Such evaporation is useful to remove latent heat so as to keep the culture medium 8 at an appropriate temperature.

Figure 5:
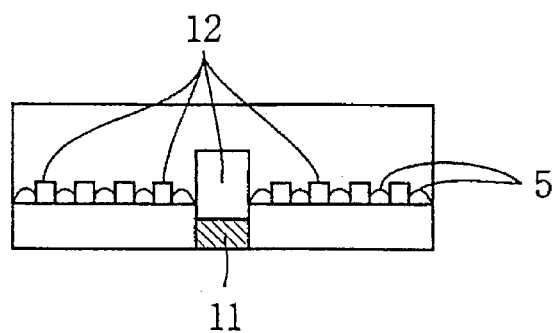
FIG. 5 is a end view of the apparatus, taken on an arrow C in FIG. 1.

As illustrated in FIGS. 3 and 4, most parts (except an area over the ditch 11) of the bottom area of the cultivation bed 1 are provided with rain water collecting means 5 for collecting rain water entering in the cultivation bed 1. As shown in these figures, the rain water collecting means 5 is formed having a wave-shape. In order to facilitate the water drainage, the rain water collecting means 5 is inclined in the longitudinal direction of the cultivation bed 1 and communicates with a plurality of drainage holes 12 (see FIG. 5) formed in one end wall of the bed.

Further, as illustrated in FIG. 1, there are formed a plurality of drainage holes 14 on both side walls along the longitudinal direction of the cultivation bed 1. Usually, the drainage holes 12 and 14 are closed, but will be opened when raining, so as to drain away the rain water entering the cultivation bed 1.

Moreover, as indicated in FIGS. 2, 3 and 4, if the bottom portions of both the cultivation bed 1 and the liquid level adjusting tank 2 are not water resistant, it is necessary to dispose a liquid tight film or sheet 4 on the inner surface of the lower and bottom portions of the cultivation bed 1 and liquid level adjusting tank 2. In this way, a possible leakage of the culture liquid can be prevented.

The operation of the crop cultivation apparatus according to the present invention will be described as follows, with reference to the flowing course of the culture liquid.

Referring to FIG. 1, a culture liquid for cultivating a crop flows from the culture liquid tank 3 through the pipe 13 into the liquid level adjusting tank 2 by gravity. The flowing of the culture liquid into the adjusting tank 2 may be shut off by the operation of the ball tap 10 when the liquid reaches a predetermined level. On the other hand, if the liquid decreases below the predetermined level, the above shut-off state may be released so that culture liquid supply may be continued until the liquid again rises to the above predetermined level.

Since the liquid level adjusting tank 2 is directly communicated with the culture liquid ditch 11, the culture liquid flows directly from the tank 2 into the ditch 11, and the liquid levels in both the tank 2 and ditch 11 will be kept at the same level all of the time, as shown in FIG. 2. Here, the aforesaid predetermined level within the adjusting tank 2 is a level beyond which the culture liquid will overflow from the ditch 11.

As shown in FIG. 4, the culture liquid in the culture liquid ditch 11 will then be absorbed upwardly through the liquid absorbent sheet 6 by virtue of capillary phenomenon. In this way, the culture liquid will be absorbed continuously to the culture medium 8 through the liquid penetration sheet 7. On the other hand, residual culture liquid no longer to be absorbed by the crop will be evaporated from the surface of the culture medium 8 through the permeable covering sheet 9.

Further, in the crop cultivation apparatus of the present invention, since the liquid penetration sheet 7 is provided to prevent the invasion of extending crop roots through the liquid absorbent sheet 6 and into the culture liquid ditch 11, a desired balanced composition of the culture liquid adjusted at an early time may be maintained during the whole operation period of the apparatus. In this manner, culture medium 8 is sure to obtain a stabilized culture liquid having an unchanged composition.

The crop cultivation apparatus of the present invention may provide at least the following effects.

Firstly, a culture liquid may be supplied from the culture liquid tank to the culture liquid ditch formed on the bottom of the cultivation bed solely by gravity, and further is supplied to the culture medium solely by means of capillary phenomenon. Therefore, electric power source and electric power equipment, both of which were required for supplying the culture liquid in the prior art, become unnecessary.

Secondly, the culture liquid may be supplied automatically through the controlling means (ball tap) and only in an exactly good amount corresponding to the consumption by crop and the evaporation from the culture medium. It is not necessary to form a liquid circuit between the culture liquid tank and the culture medium as is required in a conventional method. Thus, it is possible to avoid a problem that a crop absorbs too much of a culture liquid or only selectively absorbs one particular component of the culture liquid. Therefore, the composition of the culture liquid can be maintained at a desired balanced condition during the entire cultivation period.

Thirdly, since the cultivation bed is provided with rain water collecting means for collecting rain water entered therein, rain water may be drained away smoothly from the cultivation bed. In this way, the culture liquid in the cultivation bed may be prevented from being diluted by the rain water.

Moreover, since the culture medium is covered with a permeable covering sheet excellent in light reflection and water penetration, it is possible not only to prevent the culture medium from scattering out, but also to avoid both a temperature rising on the surface of the culture medium and a temperature rising inside the culture medium, by virtue of water evaporation through the permeable sheet.

While the presently preferred embodiment of the present invention has been shown and described above, it is to be understood that this disclosure is only for the purpose of illustration and that various changes and modifications may be made without departing from the scope of the invention as set forth in the appended claims.

What is claimed is:

1. A crop cultivation apparatus comprising:

a cultivation bed having a ditch formed on a bottom thereof for receiving and supplying a culture liquid;

a liquid level adjusting tank provided in direct liquid communication with the cultivation bed;

a culture liquid tank provided at a higher position than the cultivation bed for supplying the culture liquid to the liquid level adjusting tank solely by gravity;

a liquid absorbent sheet for upwardly absorbing the culture liquid from the ditch formed on the bottom of the cultivation bed;

a mass of culture medium provided upwardly of the liquid absorbent sheet for cultivating a crop; and rain water collecting means provided higher than said ditch covering a substantial portion of a bottom area of the cultivation bed for collecting and disposing of rain water entered in the cultivation bed, the rain water collecting means being a sheet member having a wave-shaped cross section.

2. The crop cultivation apparatus according to claim 1, wherein the liquid level adjusting tank is communicated with the ditch of the cultivation bed, said liquid level adjusting tank being provided such that an amount of the culture liquid flowing into the ditch does not exceed a predetermined level.

3. The crop cultivation apparatus according to claim 1, wherein the liquid absorbent sheet is provided such that the bottom area of the cultivation bed is covered by the sheet.

4. The crop cultivation apparatus according to claim 1, wherein the liquid absorbent sheet is partially dipped in the ditch of the cultivation bed for upwardly absorbing the culture liquid.

5. The crop cultivation apparatus according to claim 1, wherein the culture medium has side faces and a bottom face and said apparatus further includes a liquid penetration sheet covering said side faces and said bottom face.

6. The crop cultivation apparatus according to claim 1, wherein the liquid level adjusting tank includes a ball tap having a float ball, said ball tap being provided to shut off the supply of the culture liquid from the culture liquid tank when the float ball is raised to a predetermined level due to liquid buoyancy.

7. The crop cultivation apparatus according to claim 1, wherein the cultivation bed has a plurality of drainage holes formed on the side walls and on an end wall thereof, said holes being provided for draining away the rain water entered in the cultivation bed.

8. The crop cultivation apparatus according to claim 7, wherein said holes are in liquid communication with said rain water collecting means.

9. The crop cultivation apparatus according to claim 1, wherein the culture medium is PVA (polyvinyl alcohol) porous material excellent in water absorption.

10. The crop cultivation apparatus according to claim 1, wherein the culture medium is covered with a permeable covering sheet to prevent the culture medium from scattering out.

11. The crop cultivation apparatus according to claim 10, wherein the permeable covering sheet is excellent in light reflection and liquid penetration.

* * * * *